(12) United States Patent
Hager et al.

(10) Patent No.: US 10,448,559 B1
(45) Date of Patent: Oct. 22, 2019

(54) ATTACHMENT MECHANISM FOR A BLADE OR OTHER ATTACHMENT

(71) Applicants: Syd A Hager, Waseca, MN (US); Seth D Hager, Waseca, MN (US)

(72) Inventors: Syd A Hager, Waseca, MN (US); Seth D Hager, Waseca, MN (US)

(*) Notice: Subject to any disclaimer, the term of this patent is extended or adjusted under 35 U.S.C. 154(b) by 99 days.

(21) Appl. No.: 14/874,015

(22) Filed: Oct. 2, 2015

Related U.S. Application Data

(60) Provisional application No. 62/063,805, filed on Oct. 14, 2014.

(51) Int. Cl.
*A01G 20/12* (2018.01)
*A01B 76/00* (2006.01)

(52) U.S. Cl.
CPC .............. *A01B 76/00* (2013.01); *A01G 20/12* (2018.02)

(58) Field of Classification Search
CPC ....... A01B 45/04; A01B 45/045; A01B 76/00; A01B 1/246; A01G 20/12
USPC .... 403/322.1, 322.4, 326, 321, 325; 30/329, 30/337, 338, 342
See application file for complete search history.

(56) References Cited

U.S. PATENT DOCUMENTS

| | | | | |
|---|---|---|---|---|
| 590,997 A | * | 10/1897 | Masser | F16B 7/105 403/108 |
| 644,567 A | * | 3/1900 | Baetz | E06C 7/44 182/205 |
| 842,173 A | * | 1/1907 | Carman | B26B 5/00 279/77 |
| 1,169,486 A | * | 1/1916 | Holmes | B23B 31/02 279/78 |
| 1,629,674 A | * | 5/1927 | Bjork | F23H 9/00 126/169 |
| 1,998,188 A | * | 4/1935 | Dunn | B26B 5/00 261/114.1 |
| 2,905,253 A | * | 9/1959 | Ditter | A01B 45/04 172/19 |
| 3,069,820 A | | 10/1959 | Ditter et al. | |
| 2,942,674 A | * | 6/1960 | Ditter | A01B 45/04 172/103 |
| 3,658,134 A | * | 4/1972 | Bibby | A01B 45/04 172/20 |
| 3,900,950 A | * | 8/1975 | Collins | B26B 5/00 30/331 |
| 4,616,713 A | | 10/1986 | Shattuck | |
| 4,632,192 A | * | 12/1986 | Hooks | A01B 45/04 172/125 |

(Continued)

OTHER PUBLICATIONS

Magnum Harvester, Netting—Parts Brochure, http://www.magnumenp.com/Repository/5/Document/Catalog.pdf, p. 7, prior to Oct. 2, 2015.

*Primary Examiner* — Matthew Troutman

(57) ABSTRACT

An assembly for connecting an attachment to a support structure of a machine is disclosed. The assembly includes a holder on the support structure of the machine and a cam element to lock the attachment to the support structure. The cam element is rotationally connected to the support structure and rotates between an unlocked position and a locked position. As disclosed, in the locked position, the cam element extends through an opening along a backside of the holder to engage an indent surface on a backside of an attachment arm to secure the attachment to the machine.

11 Claims, 12 Drawing Sheets

(56) References Cited

U.S. PATENT DOCUMENTS

| | | | | |
|---|---|---|---|---|
| 4,674,577 | A * | 6/1987 | Meyer | A01B 45/04 172/20 |
| 5,518,040 | A * | 5/1996 | Rupflin | D03C 9/00 139/57 |
| 5,593,244 | A * | 1/1997 | Ruckert | B60N 2/2245 403/322.4 |
| 5,794,708 | A * | 8/1998 | Brophy | A01B 45/04 172/19 |
| 6,149,180 | A * | 11/2000 | Haws | A01B 59/004 172/272 |
| 6,155,154 | A * | 12/2000 | Hsu | B26D 7/2621 403/322.4 |
| 6,684,963 | B1 | 2/2004 | Poutre et al. | |
| 7,070,007 | B2 | 7/2006 | Poutre et al. | |
| 7,124,836 | B2 | 10/2006 | Poutre et al. | |
| 7,264,063 | B1 | 9/2007 | Dover | |
| 8,128,306 | B2 * | 3/2012 | Gorza | B62J 1/08 248/354.7 |
| 8,978,779 | B2 * | 3/2015 | Aposhian | A01B 45/04 172/19 |
| 8,978,799 | B2 | 3/2015 | Aposhian | |
| 2002/0084081 | A1 * | 7/2002 | Nachshon | A01B 45/04 172/19 |
| 2007/0181317 | A1 * | 8/2007 | Bednar | A01B 45/04 172/19 |

* cited by examiner

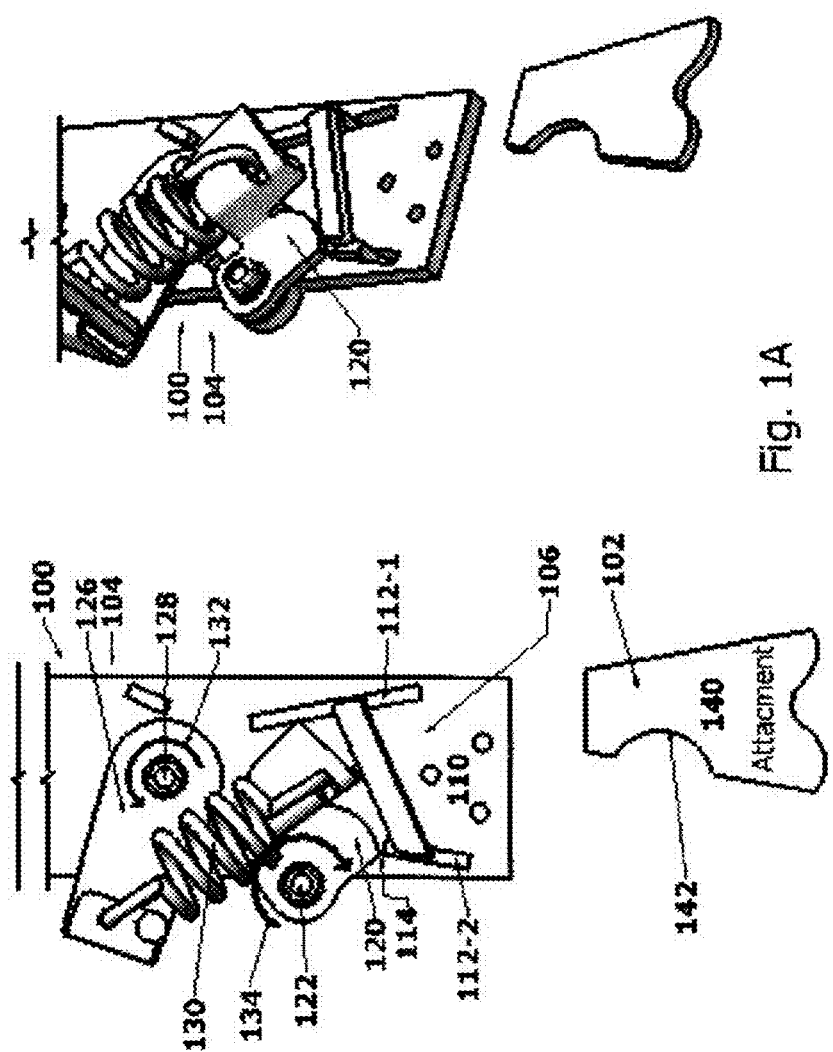

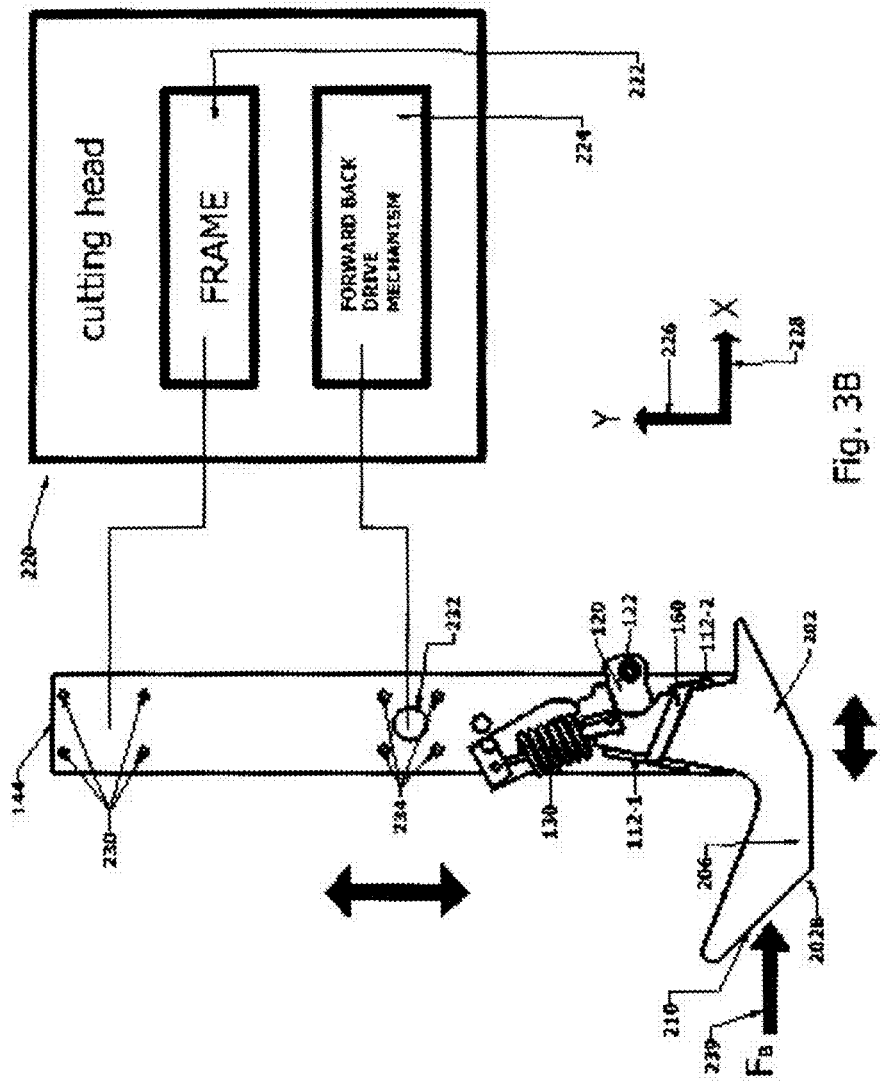

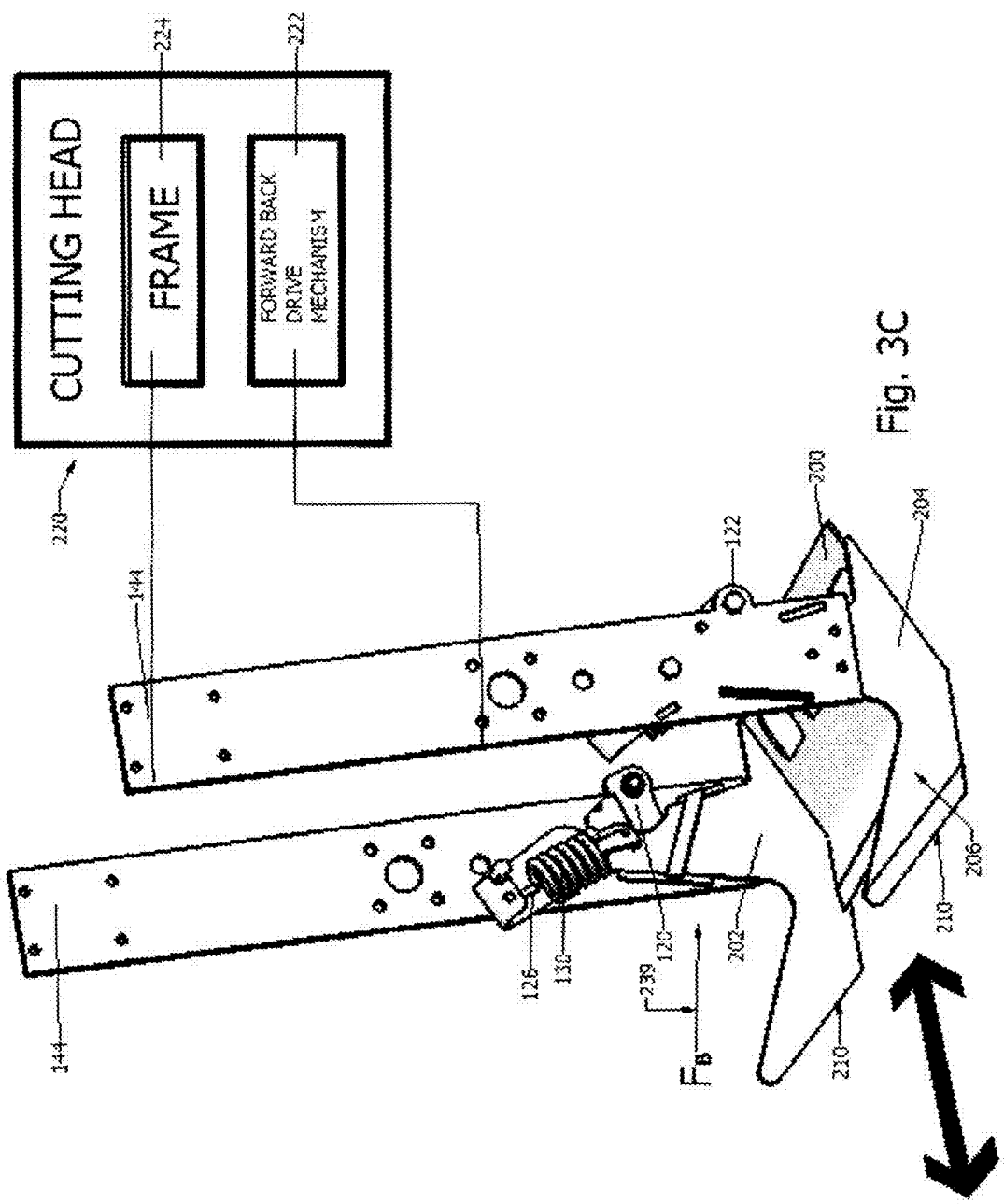

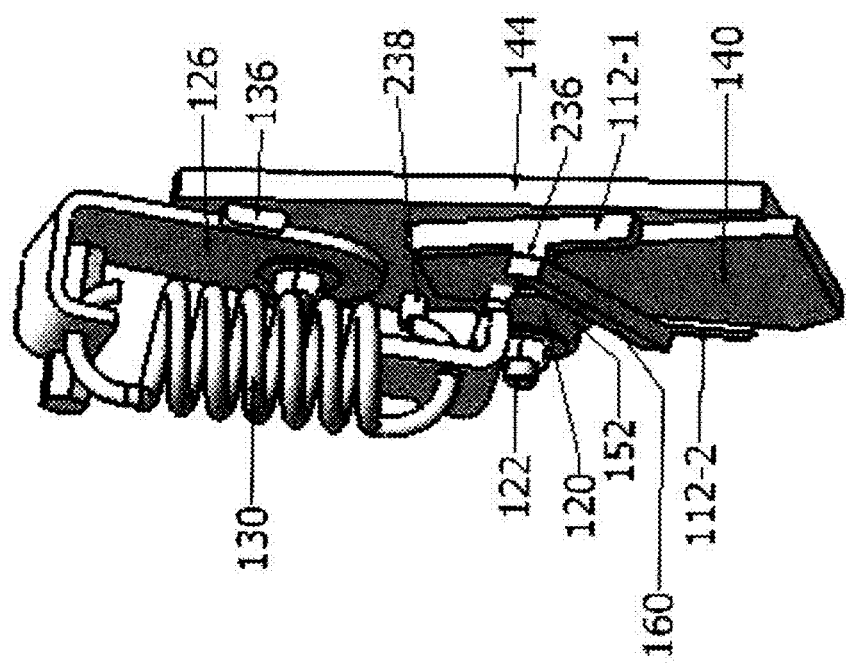

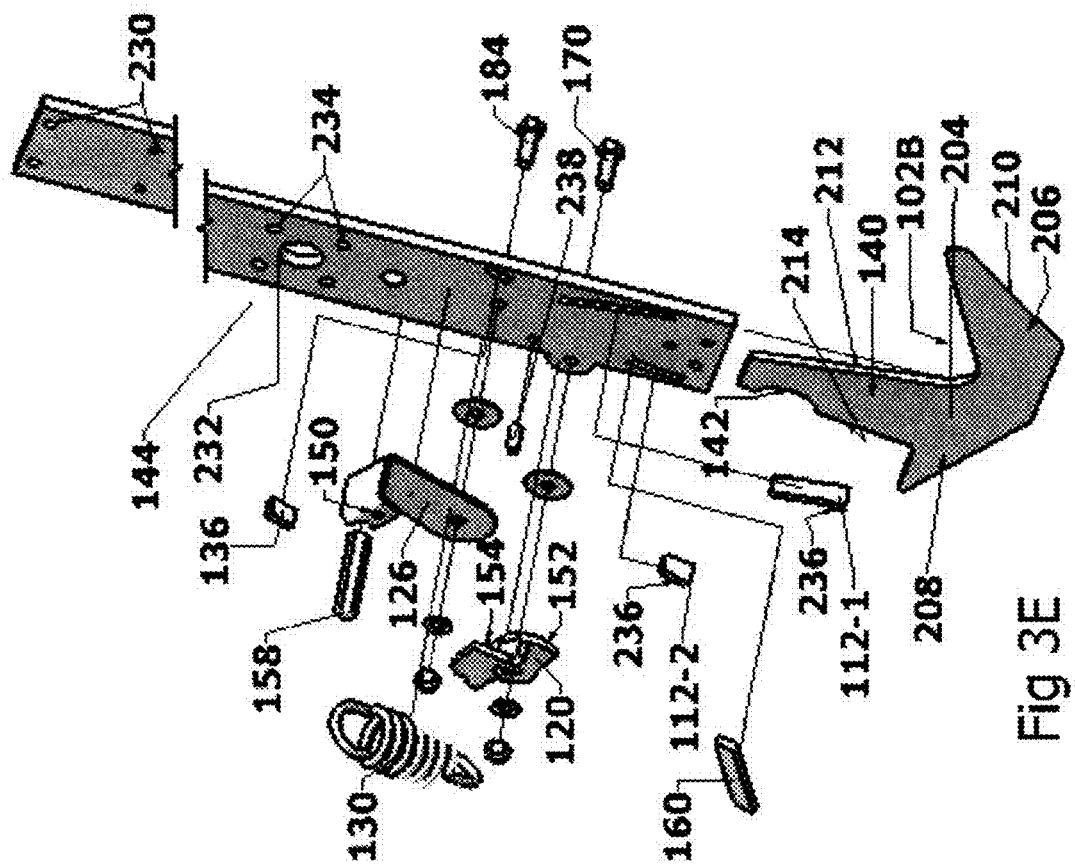

ATTACHMENT MECHANISM FOR A BLADE OR OTHER ATTACHMENT

CROSS-REFERENCE TO RELATED APPLICATION

This application claims priority to U.S. Provisional Application Ser. No. 62/063,805 filed Oct. 14, 2014 and entitled "A boltless system to hold and lock a sod cutter blade or other devices". The subject matter of the above-referenced provisional application is hereby incorporated by reference.

BACKGROUND

Many different agriculture applications and equipment use attachments that wear and need to be replaced. As an example, sod harvesters use one or more blades to cut and harvest sod. Over time the blades wear and need to be sharpened or replaced. Typically, blades or other attachments are connected to various machines and equipment through bolds. After an extended period of use, it is often difficult to remove the bolts to disconnect the blade or attachment to replace the worn or used blade or attachment.

SUMMARY

The present application relates to a boltless assembly or mechanism for connecting an attachment to a support structure of a machine or equipment. The assembly includes a holder on the support structure of the machine and a cam element to lock the attachment to the holder on the support structure. The cam element is rotationally connected to the support structure and rotates between an unlocked position and a locked position. As disclosed in the locked position, the cam element extends into a holder cavity to engage an attachment arm of the attachment. In particular, in the embodiment shown, in the locked position, the cam element engages an indent surface of the attachment arm to secure the attachment arm in the holder.

As described in illustrated embodiments, the cam element is rotated through an operating lever rotationally connected to the support structure and connected to the cam element through a spring linkage or tension spring. In an illustrated embodiment, the cam element rotates in a clockwise direction to move between an unlocked position to a locked position and the operating lever rotates in counterclockwise or opposite direction to rotate the cam element from the unlocked position to the locked position. As described, in the locked position, the cam element engage the indent surface along a backside of the holder to bias the attachment arm toward a front surface or structure of the holder to secure the attachment arm to the support structure.

As the operating lever rotates the cam element from the unlocked position to the locked position, a length of the tension spring expands to tension the spring. As the operating lever reaches the locked position spring tension is released to lock the attachment to the support structure. The mechanism or assembly described is used to attach a sod blade attachment to a machine. The sod blade attachment includes a bottom blade and opposed side blades. The side blades are connected to the support structure of the machine through spaced support arms. Each of the spaced support arms includes a holder and rotating cam element to lock attachment arms of the sod blade attachment to the machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A schematically illustrates an embodiment of an attachment assembly or mechanism of the present application for removably connecting an attachment to a support structure of a machine or equipment.

FIG. 3B is an elevational view of an attachment arm connected to a cutting head through a support arm coupled to the cutting head of the sod cutting machine.

FIG. 3C is an illustration of a blade attachment connected to a cutting head through the support arms of the sod cutting machine.

FIG. 3D is detailed illustration of a holder and cross rail structure of the locking mechanism.

FIG. 3E is an exploded view of the support arm, attachment arm and locking mechanism.

It should be appreciated that the drawings are illustrative of features and components of embodiments of the invention and are not necessarily drawn to scale and in some cases are merely schematic illustrations of the details of different embodiments of the invention.

DETAILED DESCRIPTION OF ILLUSTRATIVE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Agricultural machinery or equipment utilize various blades or attachments to perform various tasks such as cutting, harrowing or digging. Over time the attachment wears and needs to be replaced. For example, blade attachments can become dull over time and if not replaced degrade performance of the machine or equipment. Typically an attachment is connected to a support structure of a machine through one or more bolt connections. During operation and use, the blade or other attachment is typically subjected to various forces and vibration which can distort or bend the bolts making it difficult and dangerous to remove the bolts to sharpen or replace the blade or attachment.

Figure 1B:
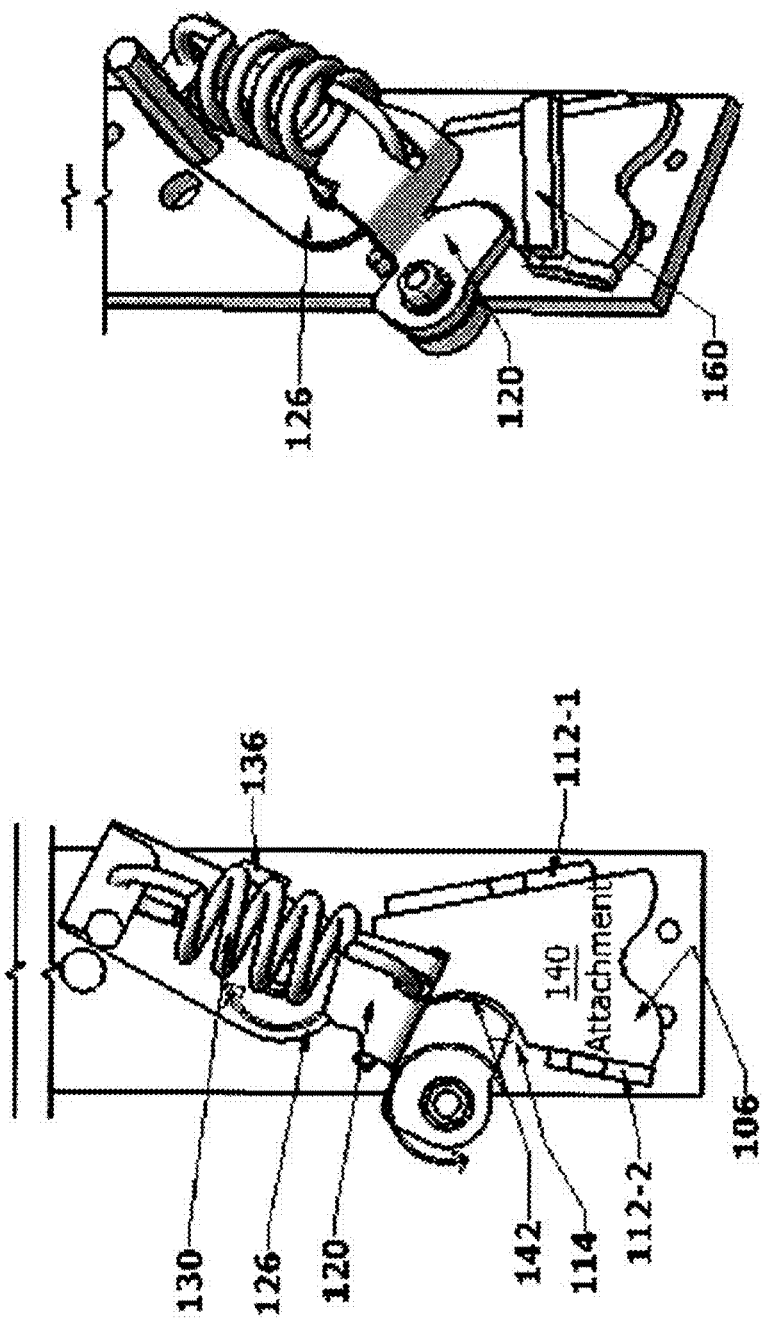
FIG. 1B is similar to FIG. 1A but the attachment is shown locked in a holder on the support structure of the machine to connect the attachment to the machine.

FIGS. 1A-1B schematically illustrate an embodiment of a boltless assembly 100 for connecting an attachment 102 to a support structure 104 of a machine. As shown in FIGS. 1A-1B, the assembly 100 includes a holder 106 on the support structure 104 and a locking mechanism to secure the attachment 102 to the support structure 104. In the embodiment shown in FIG. 1A, the holder 106 has a holder cavity 110 formed between opposed side rails 112-1, 112-2 protruding from a surface of the support structure 104. In the embodiment shown, the side rails 112-1,112-2 are angled to form a wedge shaped holder cavity 110 having open proximal and distal ends, although application is not limited to both proximal and distal open ends. A length of side rail 112-2 is smaller than side rail 112-2 to form a side opening 114 into the holder cavity 110.

The locking mechanism as shown in FIGS. 1A-1B includes a cam element 120 rotationally connected to the support structure 104 to rotate about pivot axis 122. The cam element 120 is rotationally connected to the support structure 104 to rotate between an unlocked position shown in FIG. 1A and a locked position shown in FIG. 1B. In the unlocked position, the cam element 120 is positioned alongside the holder 106. To connect the attachment 102 to the machine, the attachment 102 is inserted into the holder 106 as shown in FIG. 1B and locked via cam element 120. In the locked position shown in FIG. 1B, a contoured end of the cam element 120 extends into the holder cavity 110 through the side opening 114 to secure the attachment. As shown, the operating mechanism includes an operating lever 126 rotationally coupled to the support structure 104 to rotate about an axis 128 spaced from the pivot axis 122. The operating lever 126 is coupled to the cam element 120 via linkage 130 illustrated schematically to rotate the cam element 120 between the unlocked position and the locked position shown in FIG. 1B.

As comparatively shown in FIGS. 1A-1B, the operating lever 126 rotates in counterclockwise direction as illustrated by arrow 132 to rotate the cam element 120 clockwise as illustrated by arrow 134. As comparatively shown, the operating lever 126 moves along an operating stroke to rotate the cam element 120 between the unlocked and locked position. As shown in FIG. 1B, in the locked position, the operating lever 126 abuts stop block 136 on the support structure 104 and the cam element 120 engages the attachment 102 to lock the attachment to the support structure 104 as previously described. Although a particular rotation direction is shown, application is not limited to the specific rotation direction and in an alternate embodiment the operating lever 126 is rotated clockwise and the cam element counterclockwise to move the cam element 120 between the unlocked position and the locked position.

As schematically shown in FIG. 1A, the attachment includes an attachment arm sized for insertion into the holder 106 to connect the attachment to the support structure 104. In the illustrated embodiment, the attachment arm 140 has a wedge shaped body for insertion between the side rails 112-1, 112-2 of the wedge shaped holder 106. The attachment arm 140 includes an indent surface 142 along a side edge of the arm 140. When inserted into the holder 106, the indent surface 142 aligns with the side opening 114 and the cam element 120 in the locked position. In the locked position, the cam element 120 engages the attachment along the indent surface 142 to lock the attachment 102 to the support structure 104.

Figure 2A:
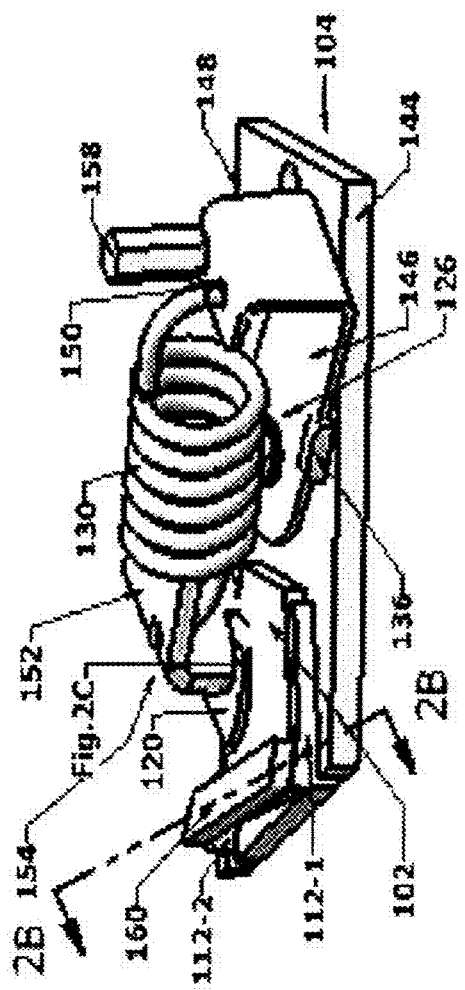
FIG. 2A is a detailed illustration of the locking mechanism and support structure of the present application.

FIG. 2A is a detailed illustration of an embodiment of the boltless assembly of the present application for connecting an attachment to the support structure 104. As shown, the support structure 104 includes a support arm 144 and the cam element 120 and operating lever 126 are rotationally connected to the support arm 144. As shown, the operating lever 126 includes elongate plate 146 and a generally L shaped bracket portion 148 having an opening 150 to connect the spring linkage 130 to the operating lever 126. As shown, the cam element 120 includes an elongate cam plate 152 and L-shaped bracket 154 to connect the spring linkage 130 to the cam element 120. As shown, the operating lever 126 includes a hex pin 158 coupled to the L-shaped bracket 148. The user uses a hex tool (not shown) to engage the hex pin 158 to apply torque to rotate the operating lever 126 and thereby rotate the cam element 120 to lock the attachment 102 to the support arm 144. In the embodiment shown, the cam element 120 and operating lever are formed of a metal material and linkage 130 is a tension spring.

Figure 2B:
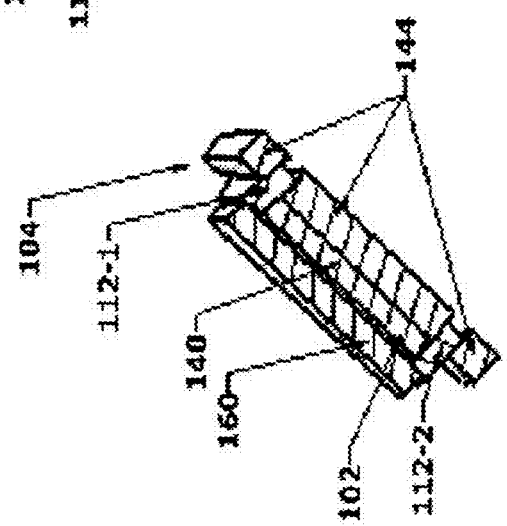
FIG. 2B is a cross-sectional view as taken along line 2B-2B of FIG. 2A illustrating the attachment inserted into the holder on the support structure.
Figure 2C:
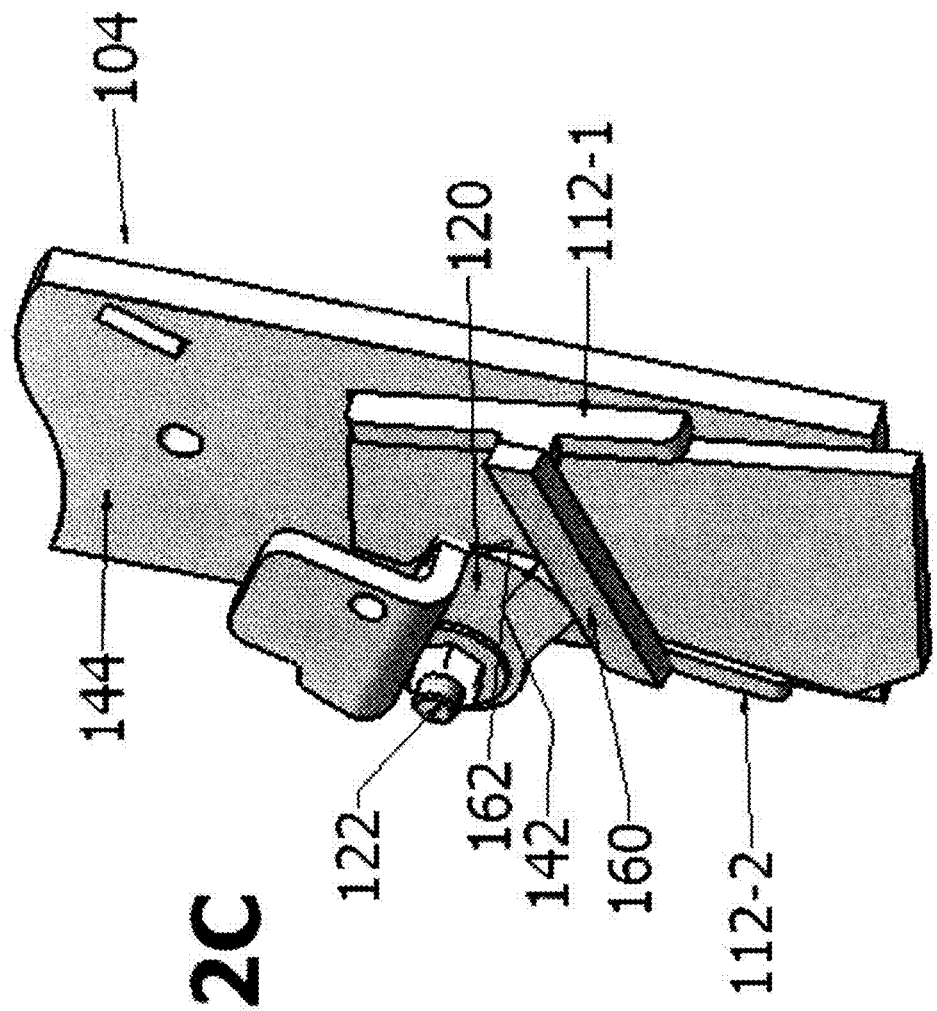
FIG. 2C illustrates an interface between a cam element and an indent surface of the attachment.

The side rails 112-1, 112-2 of the holder 106 are connected to the support arm 144 to form the side structures of the holder 106. As shown in FIGS. 2A-2B a cross rail 160 extends between side rails 112-1, 112-2 to form an upper side structure and the support arm 144 forms a lower side structure of the holder 106. As shown in FIG. 2C, in the locked position, the cam element 120 engages an undersurface 162 of the indent surface 142 to hold the attachment in the holder cavity to bias the attachment against side rail 112-1 to secure the attachment during operation. In the illustrated embodiment, the indent surface 142 is rounded, however, application is not limited to a particular shape and the indent surface 142 can have other shapes such as notched or square.

Figure 2D:
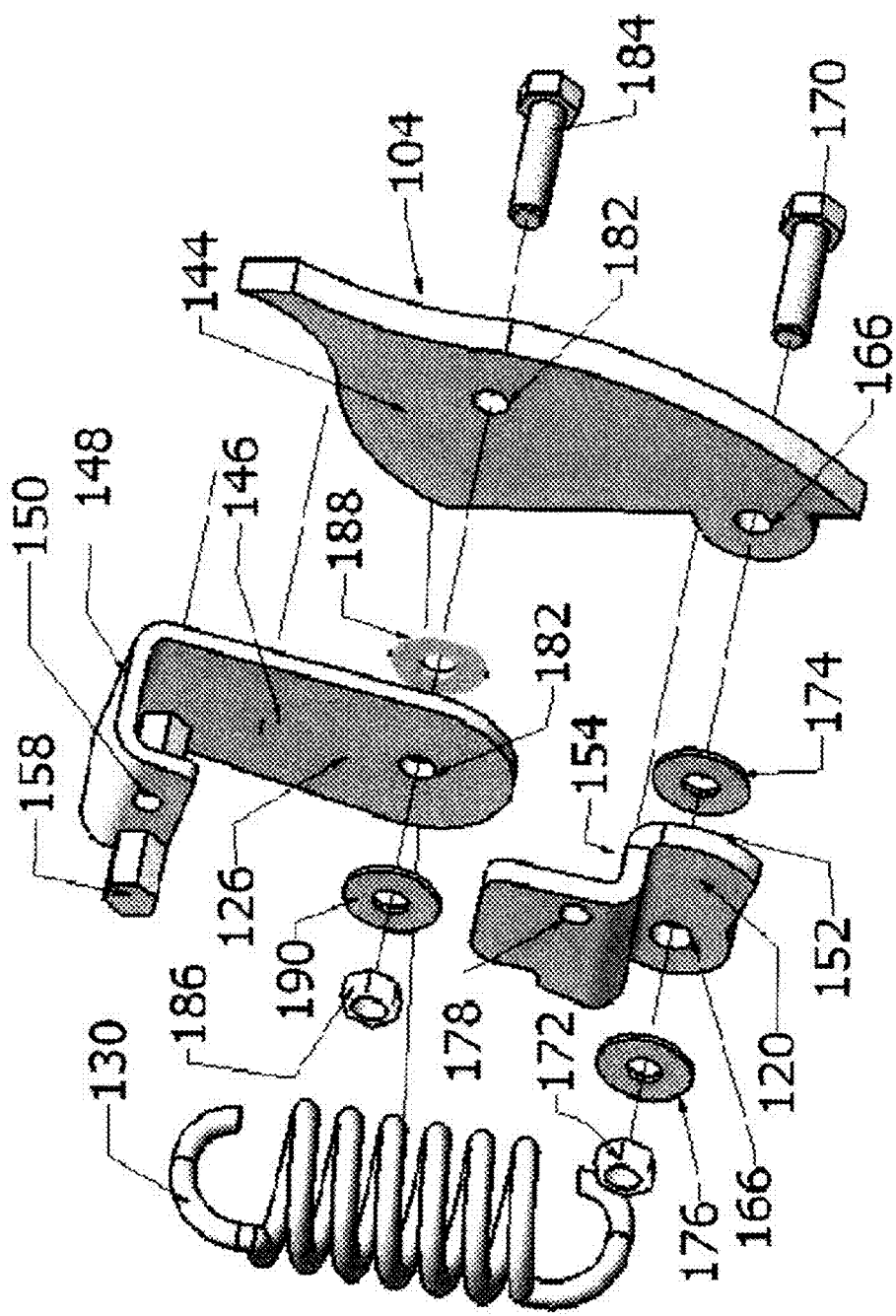
FIG. 2D is an exploded view of the locking mechanism on the support structure.

FIG. 2D is an exploded view of the cam element 120 and operating lever 126 of the locking mechanism previously described. In the embodiment shown, the cam element 120 is rotationally coupled to the support arm (schematically shown) through fasteners extending through openings 166 in the support arm 144 and cam element 120 to form the pivot axis 122. As shown, the fastener includes a threaded pivot pin 170 connected to the support arm 144 and cam element 120 via nut 172. As shown, a first washer 174 is disposed between the cam element 120 and support arm 144 and a second washer 176 is disposed between the cam element 120 and nut 172 securing the pivot pin 170 to the support arm 144. The L-shaped bracket 154 of the cam element 120 extends above the cam plate 152 and includes a spring opening 178 to connect the cam element 120 to the tension spring forming the linkage 130 as previously described. Although a particular shaped bracket is shown, application is not limited to the specific design and shape shown.

Similarly, the operating lever 126 is connected to the support arm 144 through openings 182 in the operating lever 126 and support arm 144 laterally and longitudinal spaced from openings 166 for the cam element 120. As shown the operating lever 126 is connected through opening 182 via a threaded pivot pin 184 inserted through openings 182 and fastened to the support arm 144 through nut 186. Similarly washers 188, 190 are disposed between the lever 126/ support arm 144 and bolt 186. Hex pin 158 extends from one side of the L-shaped bracket 148 and the tension spring is connected to another side of the bracket through opening 150.

Figure 3A:
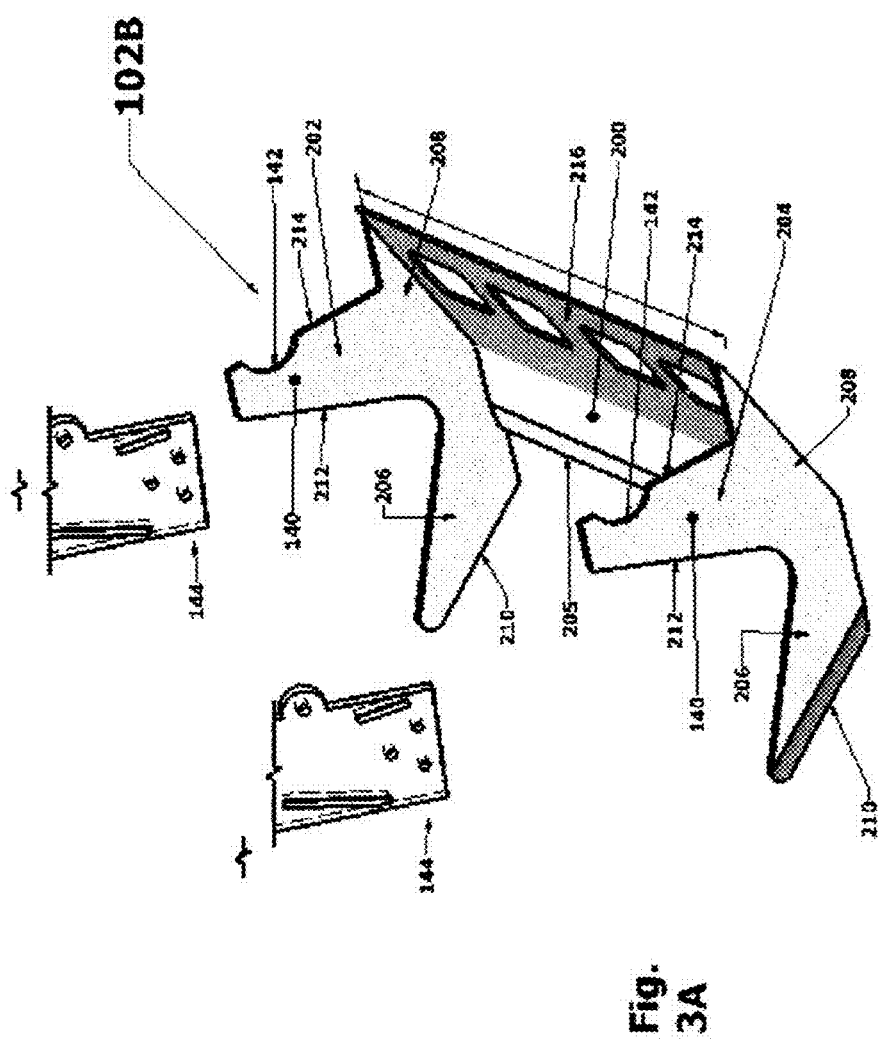
FIG. 3A illustrates a blade attachment for a sod cutting machine having indent surfaces on a backside of attachment arms of the attachment.

FIG. 3A illustrates a blade attachment connectable to the support arms 144 of a sod cutting machine through the attachment assembly of the present application. As shown the blade attachment 102B include a bottom blade 200 and opposed side blades 202, 204. As shown, a front edge of the bottom blade 200 includes a cutting edge 205 along a frontside of the bottom blade 200 to separate sod from the ground. The side blades 202, 204 are connected to the bottom blade 200 to form a width of the cut strips or sod and sod cutting zone. The side blades 202, 204 include a front toe portion 206, back heel portion 208 and a cutting edge 210 to cut the strips of sod.

As shown, the side blades 202, 204 include upright portions that form the attachment arms 140. The attachment arms 140 have frontside 212 facing the front of the blade and machine and backside 214 facing the backside of the blade and machine. In the illustrated embodiment, the upright portions or attachment arms 140 are tapered to insert into the wedge shaped holder 106. As shown, the backsides 214 of the attachment arms include the indent surface 142 for engagement of the cam element 120 to lock the attachment to the support arms 144 of the machine. As shown, a sod guide 216 is connected to and extends from a back portion of the bottom blade 200 to guide the cut sod to a roller or convey assembly (not shown). Although a particular blade embodiment is shown, application is not limited to the particular embodiment shown and different blade attachments can be used as will be appreciated by those skilled in the art.

The blade attachment is connected to a cutting head 220 of a sod cutting machine or harvester through the support arms 144 as schematically shown in FIG. 3B-3C. In the illustrated embodiment, the support arms (only one shown in FIG. 3B) are rectangular plates. The cam element 120 and operating lever 126 are on an inner surface of the support arms 144 to support blade 102B in the sod cutting zone between the support arms 144. As schematically shown, the head structure includes a forward-back reciprocating drive assembly 222 coupled to frame 224 (illustrated schematically) of the cutting head 220. The forward-back drive mechanism 222 reciprocally moves the blade in a forward direction and backward direction along an x-axis as shown by arrow 228. The drive 222 includes one or more drive motors and various linkage components to impart reciprocal movement to the blade. Illustratively the drive motors are hydraulic drive motors and the linkage components include various belts, rods and cam devices as will appreciated by those skilled in the art and familiar with sod harvester machines such as sod harvester machines available from Kesmac Inc. of Ontario Canada www.brouwerturf.com and Magnum Harvesters of Bucyrus Equipment Company of Hillsdale, Kans., www.magnumenp.com.

As shown, the support arms 144 are connected to the frame 224 through fastener openings 230 on an upper end of the support arm 144. In the embodiment shown the upper end of the support arm 144 includes four fastener openings 230 to attach the support arms 144 to a flanged end of the cutting head frame 224. The forward back drive assembly 222 is coupled to an intermediate region of the support arm 144 between the upper and lower ends of the support arm 144. As shown, the intermediate region includes an opening 232 for a drive shaft and fastener openings 234 to connect a flanged end of the drive shaft to impart output from the forward back drive assembly 222 to the blade attachment 102B through the support arms 144.

FIG. 3D shows in more detail the sloped cross bar surface 236 along rails 112-1, 112-2 to support the cross-bar 160 at the incline angle as previously described and end stop 238. FIG. 3E illustrates the support arm 144, locking mechanism and side blade exploded. As shown, the rails 112-1, 112-2 for the holder are attached to an inner surface of the support arm 144 as well as a distal end stop 238 to define a top end of the holder cavity 110. The pivot axis 128 for the operating lever 126 is above and forward of the pivot axis 122 for the cam element 120. As shown, the cross-rail 160 is connected to rails 112-1, 112-2 along an inclined sloped surface 236 of the rails 112-1, 112-2 to support the cross bar 160 at an inclined angle. As shown the sloped surface 236 has a higher height dimension at a proximal side relative to a distal side to support the cross bar 160 at an angle. The angled cross bar 160 provides a larger inlet opening for insertion of the attachment arm 140 into the holder 106. As shown, a thickness of the cam plate 152 is approximately the same as a thickness of the attachment arms 140 to provide a low profile lock mechanism which does not interfere with the sod cutting zone between side blades 202, 204. Similarly the height of rails 112-1, 112-2 is sized to provide a holder cavity height to accommodate the thickness of the attachment arms 140.

During operation, the sod cutting machine is driven forward to cut sod into strips. The machine can self-propelled or user powered. The machine can be a walk behind machine or a vehicle having an operator cab. As the machine moves forward, the cutting edges 210 of the side blades 202, 204 cut the sod into strips. Engagement of the blade as shown, imparts a backward force to the blade as illustrated by arrow 239 as shown in FIG. 3B. As shown, the bias force imparted by the cam element 120 to the attachment against the front holder structure or rail counteracts the backward force as illustrated by arrow 239 to secure the blade attachment 102B to the support arms 144 as previously described. The mechanism described provides a low profile attachment on an inner surface of the support arms 144 which limits interference with the sod cutting zone between the opposed side blades 202, 204 of the blade attachment 102B shown in FIG. 3A. In particular, as shown, the placement of the operating lever 126 above the cam element 120 limits interference with the sod cutting zone. As shown, in the locked position, the operating lever 126 is orientated generally upright and spaced from the cutting zone so that the operating lever 126 is clear of the cutting zone.

Figure 4A:
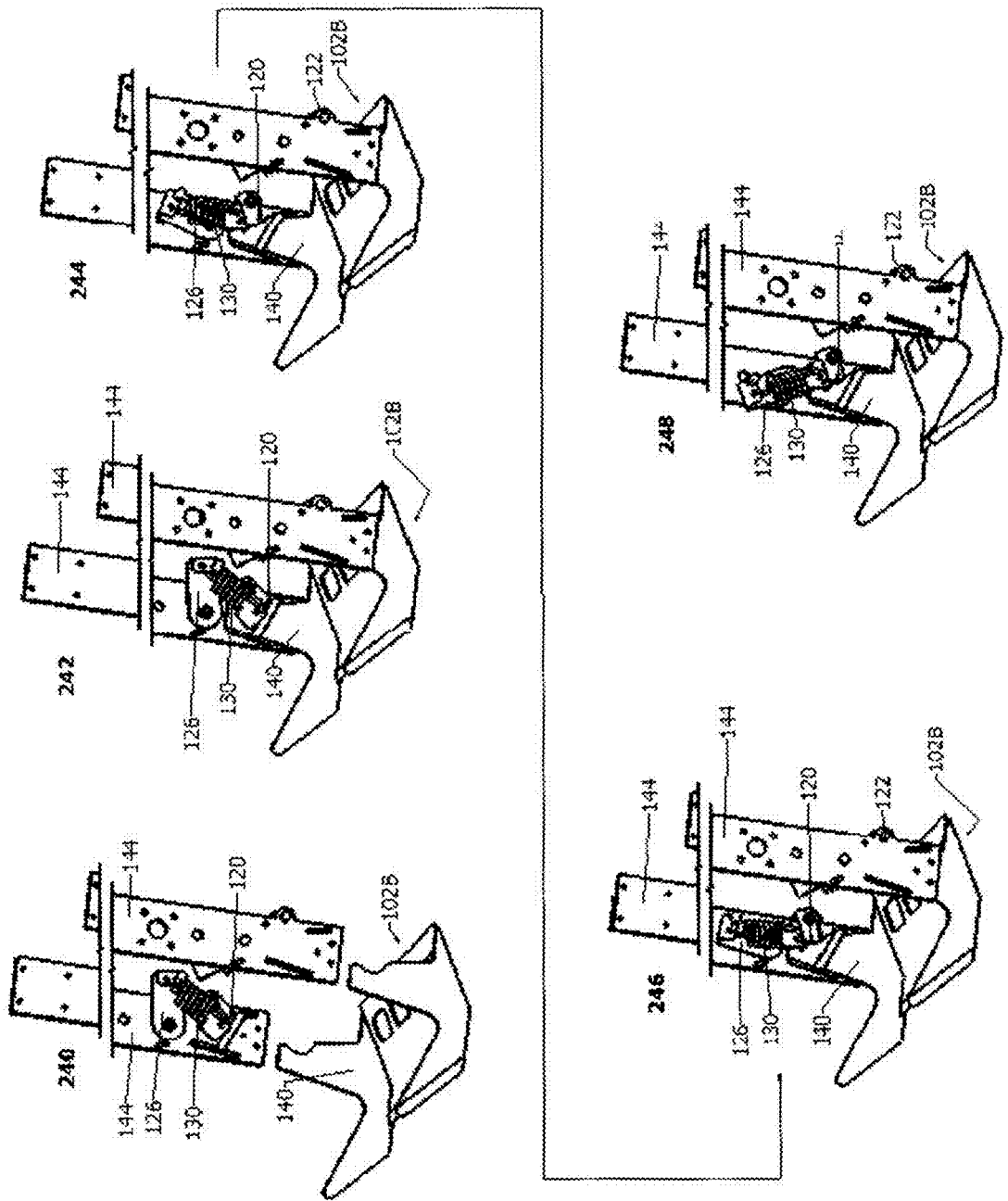
FIG. 4A illustrates a sequence of process steps for connecting a blade attachment to a support structure of a machine.

FIG. 4A illustrates process steps for connecting an attachment to the support structure or arms 144. As shown in step 240, the attachment arms 140 are inserted into the holder 106 while the cam element 120 is in the unlocked position along the backside of the holder 106. As shown in steps 242 and 244, once the attachment arm 140 is inserted, the operating lever 126 is rotated counterclockwise to rotate the cam element clockwise as previously described. Rotation of cam element 120 clockwise, engages an end of the cam element 120 with the indent surface 142 as illustrated in steps 244, 246. As illustrated in steps 246, 248 the operating lever 126 is rotated past an upright position to stop 136. Rotation of the operating lever 126 beyond the upright position releases tension on the spring.

As shown in order to unlock the attachment, sufficient torque must be applied to the operating lever to rotate the operating lever 126 past the upright position to the move the cam element to the unlocked position. Thus, the spring tension required to rotate the operating lever past the upright position acts to limit inadvertent disconnection of the attachment 102B. The spacing between the side rails 112-1, 112-2 is large enough to provide sufficient clearance between the side rails 112-1, 11-2 and the attachment 140 so that the attachment can be easily removed from the holder 106 without tools or implements while the cam element 120 provide sufficient force to hold the attachment in place for use. Thus, the cam element 120 allows for sufficient clearance between the rails 112-1, 112-2 and attachment arms 140 to easily remove the attachment 140 for replacement.

Figure 4B:
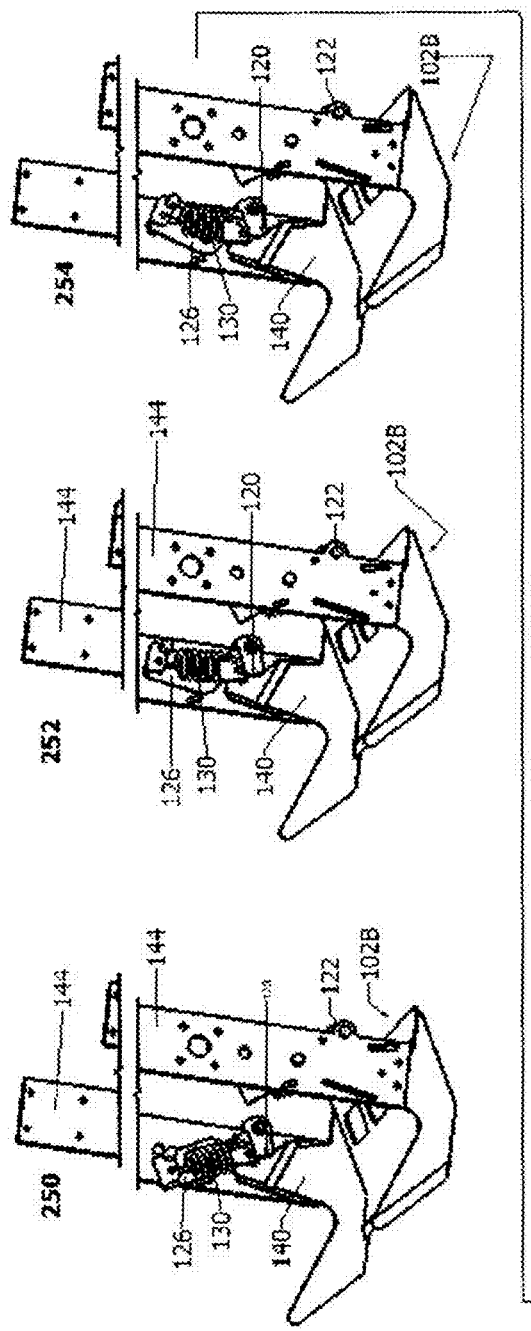
FIG. 4B illustrates a sequence of process steps for disconnecting the blade attachment from the support structure of the machine.
Figure 4B:
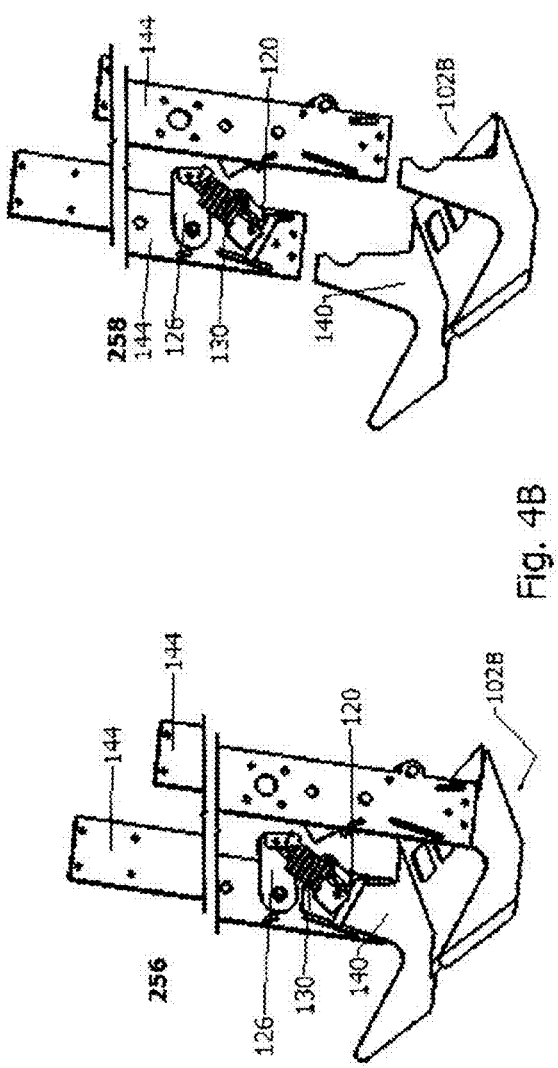

FIG. 4B illustrates process steps for disconnecting the attachment 102B from the support structure or arms 144 to replace the attachment when worn. As previously described, to disconnect the attachment, the operating lever 126 is progressively rotated clockwise from the forward locked position to an unlocked position as illustrated in steps 250, 252, 254. As previously described, sufficient force must be supplied to extend the spring to move the operating lever from the locked position to the upright position. As the operating lever reaches the backward position, the cam element 120 is rotated counterclockwise to the unlocked position to allow the attachment arm 140 to slide out of the holder 106 to disconnect the attachment for replacement as shown in steps 256, 258.

While embodiments of the mechanism or assembly of the present application have been described, application of the present invention is not limited to the particular embodiments described, and alternate embodiments can be used that implement one or more of the attachment features or mechanisms of the present application. Furthermore, application is not limited to the particular blade attachment 102B shown in FIGS. 3A-3C.

What is claimed is:

1. A blade attachment combination for a cutting machine, comprising:
   first and second support arms connectable to support structure of the cutting machine;
   a first locking mechanism attached to the first support arm, the first locking mechanism comprising a first cam element rotatably coupled to the first support arm and rotatable between an unlocked position and a locked position,
   a second locking mechanism attached to the second support arm, the second locking mechanism comprising a second cam element rotatably coupled to the second support arm and rotatable between an unlocked position and a locked position;
   a bottom blade having a bottom cutting edge;
   a first side blade coupled to the bottom blade and having a first side cutting edge and a first attachment arm having a first indent surface recessed from a back edge of the first attachment arm interfacing with the first locking mechanism; and
   a second side blade coupled to the bottom blade and having a second side cutting edge and a second attachment arm having a second indent surface recessed from the back edge of the second attachment arm interfacing with the second locking mechanism;
   wherein the first cam element engages the first attachment arm along the first indent surface to lock the first attachment arm to the first support arm; and
   wherein the second cam element engages the second attachment arm along the second indent surface to lock the second attachment arm to the second support arm.

2. The blade attachment combination of claim 1 wherein the first and second attachment arms are wedge shaped attachment arms configured for insertion into first and second wedge shaped holders on the support arms.

3. The blade attachment combination of claim 1 wherein the first and second locking mechanisms each include a backside opening and in the locked position the first and second cam elements extend into holder cavities through the backside openings of the first and second locking mechanisms to secure the first and second attachment arms to the first and second support arms.

4. The blade attachment combination of claim 1 further comprising;
   a first operating lever rotationally connected to the first support arm and coupled to the first cam element through a first tension spring to rotate the first cam element between the unlocked position and the locked position; and
   a second operating lever rotationally connected to the second support arm and coupled to the second cam element through a second tension spring to rotate the second cam element between the unlocked position and the locked position.

5. The blade attachment combination of claim 4 wherein the first and second operating levers rotate in a first direction to move the first and second cam elements from the unlocked position to the locked position and the first and second operating levers rotate in a second direction different from the first direction to rotate the first and second cam elements from the locked position to the unlocked position.

6. The blade attachment combination of claim 4 wherein the first and second operating levers have an operating stroke including a tension phase between the unlocked position and the locked position and in tension phase a length of the spring is extended and wherein as the first and second operating levers are rotated toward the locked position, tension is released.

7. The blade attachment combination of claim 1 wherein the first and support arms include one or more fastener openings to connect the first and second support arms to a frame and a drive mechanism of the cutting machine.

8. A cutting machine comprising:
   A cutting head comprising:
      A forward-back drive mechanism connected to a frame structure of the cutting machine; and
      first and second support arms each having one or more fastener openings to connect the support arms to the frame structure and one or more fastener openings to connect the support arms to the forward-back drive mechanism;
      the first and second support arms comprising:
         a first locking mechanism attached to the first support arm, the first locking mechanism comprising a first cam element rotatably coupled to the first support arm and rotatable between an unlocked position and a locked position, and
         a second locking mechanism attached to the second support arm, the second locking mechanism comprising a second cam element rotatably coupled to the second support arm and rotatable between an unlocked position and a locked position;
   a bottom blade having a bottom cutting edge;
   a first side blade coupled to the bottom blade and having a first side cutting edge and a first attachment arm having a first indent surface recessed from a back edge of the first attachment arm interfacing with the first locking mechanism; and a second side blade coupled to the bottom blade and having a second side cutting edge and a second attachment arm having a second indent surface recessed from the back edge of the second attachment arm interfacing with the second locking mechanism;

wherein the first cam element engages the first attachment arm along the first indent surface to lock the first attachment arm to the first support arm; and wherein the second cam element engages the second attachment arm along the second indent surface to lock the second attachment arm to the second support arm.

9. The cutting machine of claim 8 wherein the first and second locking mechanisms each include front and backside structures angled so that each locking mechanism comprises a holder cavity that is wedge shaped; and wherein each of the first and second attachment arms are wedge shaped.

10. The cutting machine of claim 8 wherein each of the support arms includes an operating lever coupled to the cam element through a tension spring to rotate the cam element between the unlocked position and the locked position.

11. The cutting machine of claim 8 wherein the support arms include inner and outer surfaces and the cam elements are rotationally connected to the inner surfaces of the support arms.

* * * * *